US009783656B2

(12) United States Patent
Lehmann et al.

(10) Patent No.: US 9,783,656 B2
(45) Date of Patent: Oct. 10, 2017

(54) SURFACE TREATMENT OF PARTICLES AND THEIR USE

(71) Applicants: Kathrin Lehmann, Leverkusen (DE); Frauke Henning, Essen (DE); Christian Mund, Essen (DE); Bernd Rohe, Moers (DE); Petra Fritzen, Moers (DE); Joerg Hocken, Meerbusch (DE)

(72) Inventors: Kathrin Lehmann, Leverkusen (DE); Frauke Henning, Essen (DE); Christian Mund, Essen (DE); Bernd Rohe, Moers (DE); Petra Fritzen, Moers (DE); Joerg Hocken, Meerbusch (DE)

(73) Assignees: Evonik Degussa GmbH, Essen (DE); Huntsman P&A Germany GmbH, Duisburg (DE)

( * ) Notice: Subject to any disclaimer, the term of this patent is extended or adjusted under 35 U.S.C. 154(b) by 0 days.

(21) Appl. No.: 15/106,557

(22) PCT Filed: Dec. 8, 2014

(86) PCT No.: PCT/EP2014/076817
§ 371 (c)(1),
(2) Date: Jun. 20, 2016

(87) PCT Pub. No.: WO2015/091041
PCT Pub. Date: Jun. 25, 2015

(65) Prior Publication Data
US 2017/0002181 A1   Jan. 5, 2017

(30) Foreign Application Priority Data
Dec. 20, 2013   (DE) .................. 10 2013 226 800

(51) Int. Cl.
| C08K 9/06 | (2006.01) |
| C09C 1/36 | (2006.01) |
| C09C 3/12 | (2006.01) |
| C09C 1/02 | (2006.01) |
| C09C 1/06 | (2006.01) |
| C08J 3/22 | (2006.01) |
| C08J 5/18 | (2006.01) |

(52) U.S. Cl.
CPC .............. C08K 9/06 (2013.01); C08J 3/226 (2013.01); C08J 5/18 (2013.01); C09C 1/027 (2013.01); C09C 1/06 (2013.01); C09C 1/3684 (2013.01); C09C 3/12 (2013.01); *C01P 2006/20* (2013.01); *C08J 2323/06* (2013.01); *C08J 2367/00* (2013.01); *C08J 2467/00* (2013.01); *C08J 2483/12* (2013.01)

(58) Field of Classification Search
CPC ......... C09C 1/06; C09C 1/027; C09C 1/3684; C08K 9/06; C08J 3/226
See application file for complete search history.

(56) References Cited

U.S. PATENT DOCUMENTS

| 4,544,415 | A | 10/1985 | Franz et al. |
| 4,886,551 | A | 12/1989 | Fink et al. |
| 6,858,663 | B2 | 2/2005 | Knott et al. |
| 7,018,458 | B2 | 3/2006 | Knott et al. |
| 7,118,619 | B2 | 10/2006 | Bender-Brandt et al. |
| 7,393,396 | B2 | 7/2008 | Lehmann et al. |
| 7,399,487 | B2 | 7/2008 | Batz-Sohn et al. |
| 7,442,724 | B2 | 10/2008 | Favreese et al. |
| 7,619,035 | B2 * | 11/2009 | Henning ................ C08G 77/06 524/838 |
| 7,759,402 | B2 | 7/2010 | Venzmer et al. |
| 7,829,647 | B2 | 11/2010 | Brueckner et al. |
| 8,138,294 | B2 | 3/2012 | Henning et al. |
| 8,172,936 | B2 | 5/2012 | Herrwerth et al. |
| 8,202,935 | B2 | 6/2012 | Cavaleiro et al. |
| 8,268,939 | B2 | 9/2012 | Ebbrecht et al. |
| 8,283,422 | B2 | 10/2012 | Schubert et al. |
| 8,309,664 | B2 | 11/2012 | Knott et al. |
| 8,334,355 | B2 | 12/2012 | Henning et al. |
| 8,420,748 | B2 | 4/2013 | Henning et al. |
| 8,598,295 | B2 | 12/2013 | Henning et al. |
| 8,623,984 | B2 | 1/2014 | Henning et al. |
| 8,779,079 | B2 | 7/2014 | Henning et al. |
| 8,802,744 | B2 | 8/2014 | Knott et al. |
| 8,841,400 | B2 | 9/2014 | Henning et al. |
| 8,946,369 | B2 | 2/2015 | Henning et al. |
| 9,005,361 | B2 | 4/2015 | Henning et al. |
| 2003/0228271 | A1 | 12/2003 | Batz-Sohn et al. |
| 2007/0199477 | A1 | 8/2007 | Hill et al. |

(Continued)

FOREIGN PATENT DOCUMENTS

| CN | 1342731 A | 4/2002 |
| CN | 102286220 | 12/2011 |

(Continued)

OTHER PUBLICATIONS

International Search Report dated Mar. 19, 2015 in PCT/EP14/076817 Filed Dec. 8, 2014.
Chinese Office Action dated May 27, 2017, in Chinese Patent Application No. 201480069650.X, filed Dec. 8, 2014.
Combined Office Action and Search Report dated Apr. 13, 2017 in Russian Patent Application No. 2016129078/05 (045268) with English translation.

*Primary Examiner* — Marc Zimmer
(74) *Attorney, Agent, or Firm* — Oblon, McClelland, Maier & Neustadt, L.L.P.

(57) ABSTRACT

Surface treatment of titanium dioxide, barium sulfate, zinc sulfide, and/or lithopone particles, and mixtures of said particles with specific alkoxylated siloxanes for the improvement of dispersion in plastics.

21 Claims, 2 Drawing Sheets

(56) References Cited

U.S. PATENT DOCUMENTS

| | | | |
|---|---|---|---|
| 2008/0125503 A1 | 5/2008 | Schiller et al. | |
| 2010/0022435 A1 | 1/2010 | Knott et al. | |
| 2011/0160389 A1 | 6/2011 | Bubat et al. | |
| 2011/0306694 A1 | 12/2011 | Glos et al. | |
| 2012/0027704 A1* | 2/2012 | Henning | A61K 8/892 424/59 |
| 2012/0190760 A1 | 7/2012 | Henning et al. | |
| 2012/0190762 A1 | 7/2012 | Hubel et al. | |
| 2013/0041115 A1 | 2/2013 | Knott et al. | |
| 2014/0205552 A1* | 7/2014 | Fukuhara | A61K 8/922 424/59 |
| 2014/0256844 A1 | 9/2014 | Henning et al. | |
| 2016/0362556 A1 | 12/2016 | Lehmann et al. | |

FOREIGN PATENT DOCUMENTS

| | | |
|---|---|---|
| DE | 10 2008 031 901 A1 | 1/2010 |
| EP | 0 141 174 A1 | 5/1985 |
| EP | 0 265 807 A2 | 5/1988 |
| GB | 1 348 372 | 3/1974 |
| HU | 216 858 B | 9/1999 |
| JP | 08-120191 A * | 5/1996 |
| RU | 2 268 904 C2 | 1/2006 |
| RU | 2 404 220 C2 | 11/2010 |

* cited by examiner

SURFACE TREATMENT OF PARTICLES AND THEIR USE

FIELD OF THE INVENTION

Surface treatment of titanium dioxide, barium sulfate, zinc sulfide, and/or lithopone particles, and mixtures of said particles with specific alkoxylated siloxanes for the improvement of dispersion in plastics.

PRIOR ART

Plastics formulated to give polymer compositions are divided into the main groups of thermoplastics and thermosets.

The term thermoplastics is used here for those polymers whose flow transition range is above the usage temperature. Thermoplastics are linear or branched polymers which in principle become flowable above the glass transition temperature (Tg) in the case of amorphous thermoplastics and above the melting point (Tm) in the case of (semi)crystalline thermoplastics. In the softened state they can be processed into moldings by compression, extrusion, injection molding, or other shaping processes. Chain mobility increases here to an extent that permits easy sliding of each polymer molecule with respect to others, the material becoming molten (flow region, polymer melt). The thermoplastics also include thermoplastically processable plastics with pronounced entropy-elastic properties known as thermoplastic elastomers. The thermoplastics include all plastics composed of polymer molecules that are linear or that have been cross-linked in a manner that is thermally labile, examples being polyolefins, vinyl polymers, polyesters, polyacetals, polyacetates, polycarbonates, and also some polyurethanes and ionomers, and also TPEs—thermoplastic elastomers (RÖMPP ONLINE, vers. 3.7, Carlowitz and Wierer, Kunststoffe (Merkblätter) [Plastics (Datasheets)], Chapter 1, Thermoplaste [Thermoplastics], Berlin: Springer Verlag (1987), Domininghaus, pp. 95 ff.).

Thermosets are plastics produced via irreversible and close-meshed crosslinking by way of covalent bonds from oligomers (in technical terms: prepolymers), or less frequently from monomers or polymers. The term "thermoset" is used here for the raw materials prior to crosslinking (see reactive resins) and also as a collective term for the hardened, mostly completely amorphous resins. At low temperatures, thermosets are energy-elastic, and even at higher temperatures they are not capable of viscous flow, but instead exhibit elastic behavior with very restricted deformability. The thermosets include inter alia the following groups of industrially important materials: diallyl phthalate resins (DAP), epoxy resins (EP), urea-formaldehyde resins (UF), melamine-formaldehyde resins (MF), melamine-phenol-formaldehyde resins (MPF), phenol-formaldehyde resins, and unsaturated polyester resins (UPES) (RÖMPP ONLINE, vers. 3.7, Becker, G. W.; Braun, D.; Woebcken, W., Kunststoff-Handbuch [Plastics handbook], vol. 10: Duroplaste [Thermosets], 2nd Edn.; Hanser: Munich, (1988); Elias (6th) 1, 7, 476 ff.).

Gilbert (Gilbert, Varshney, van Soom und Schiller, "Plate-out in PVC Extrusion—I. Analysis of plate-out", Journal of Vinyl and Additive Technology, (14) 1, 2008, 3-9) describes the use of Ca stearate or other soaps or the corresponding carboxylic acids such as stearic acid for a surface treatment of titanium dioxide, or barium sulfate, or mixtures thereof. This method can produce undesired side-effects, because in large-scale pigment-production processes products of this type often either give rise to difficulties in use or lead to what is known as plate-out during production of highly filled masterbatches, i.e. concentrates of the pigments in a thermoplastic matrix. This means that heat causes deposition of the thermoplastic pigment mixture on the screw or the interior of the extruder barrel. This necessitates complicated cleaning, particularly during color changes. Layers thus deposited can moreover become detached at any time, and lead to formation of specks of undispersed material in the masterbatch, and also subsequently in the final application by way of example to specks of undispersed material in thin films.

GB 1 288 581 moreover discloses the use of silicone oils of varying chain length/viscosity which are either applied by spraying during the milling of the pigment or can be introduced as emulsion into a pigment slurry. Although pigments with silicone oil surface treatment exhibit good hydrophobicity and, because of their low surface energy, are generally known to be readily amenable to introduction into a low energy plastics environment, pigments thus treated have a variety of disadvantages:

1. Particles treated with silicone oil exhibit high susceptibility to dusting. Although by way of example titanium dioxide, with a relatively high density of 3.9 g/cm$^3$, should not necessarily exhibit this type of susceptibility, U.S. Pat. No. 3,649,321 discloses high susceptibility to dusting after treatment with silicone oil. The susceptibility to dusting is very problematic during further processing, and indeed can have safety implications.
2. Low bulk density of the pigments treated with silicone oil leads to problems during draw-off of the pigment into big bags or other bags, or into a silo. High air content results in low mass per pack unit during filling. If the bagged product cannot be stacked flat on a pallet, increased cost is incurred for strapping or for film overwrap of the pallets. This problem in particular arises during automatic draw-off with pneumatic conveying, which can be regarded as standard practice for high throughputs.

Silicone oils as surface treatment can lead to other problems in the production of consumer products, e.g. to poor coatability, printability, and/or weldability of films, and in particular in multilayer films this can extend to delamination of layers and to loss of function (Plastics Additives: Advanced Industrial Analysis, 2006, Jan C. J. Bart, pages 419-420; IOC Press, Netherlands, ISBN 1-58603-533-9; Trouble Shooting Guide brochure—Siegwerk, March 2013).

DE 41 40 793, EP 0 546 407 and EP 0 546 406 disclose that silicone oils or silane-based structures such as methacryloxypropyltrimethoxysilane are suitable for coating of oxidic and other surfaces, the aim here being hydrophobization or functionalization of the surface and reduction of viscosity, and thus to provide higher compatibility with the surrounding organic medium, thus increasing the efficiency of the pigments used. Silanes are susceptible to hydrolysis, and generally require an elevated temperature of about 80° C. to activate the silyl functionality on the pigment surface or filler surface, and to form a polymeric structure on the surface. Many pigment production processes are aqueous slurry processes or produce the pigments, for example titanium dioxide, via precipitation reactions in water, and there is therefore a requirement for easy introduction into the process of surface-treatment agents in aqueous form, e.g. in emulsified form, to be possible. There is another requirement in processes in which dry pigments or fillers are surface-treated: these processes do not automatically allow a significant increase of temperature above ambient temperature, or incur additional costs therefor; this is a process disadvantage for the coupling of silanes, because temperatures required for the elimination of the alcohol here are above 80° C. There was therefore a requirement to provide, for dry milling processes or dry mixing processes, surface treatment which, where necessary, also ensures surface modification without temperature increase. It would moreover be advantageous to use a process in which no alcohol is eliminated, thus avoiding expensive explosion protection during the milling processes and/or drying processes.

A problem consists in the dispersion of hydrophilic inorganic pigments such as titanium dioxide, barium sulfate, zinc sulfate, and/or lithopones, where these have a large number of hydroxy groups (HO—) and/or thiol groups (HS—) at the surface.

High cost due to long dispersion times has to be accepted, or inadequate dispersion is obtained, with unacceptable defects in the final product. These defects can be: In plastics films, specks of undispersed material which not only affects the esthetics of the product but also can lead to perforation and thus to permeability in the packaging; in injection moldings, specks of undispersed material can lead to mechanical defects, i.e. markedly reduced tensile strength or impact resistance, and thus to a high rejection rate in the injection-molding process, or indeed to failure of plastics components having safety implications in the automobile or electronics sector.

Surface-treated particles intended for use in plastics packaging for use with foods are subject to the European standard EC 10/2011, and/or to standards issued by the American FDA.

It was therefore an object of the invention to provide appropriate treatment of the surfaces of titanium dioxide particles, barium sulfate particles, zinc sulfide particles, and/or lithopone particles to reduce tendency towards dusting.

DESCRIPTION OF THE INVENTION

Surprisingly, it has been found that the object is achieved via specific polyether-modified siloxanes as described in the claims.

The present invention therefore provides surface-treated $TiO_2$, $BaSO_4$, ZnS, and/or lithopone particles obtainable by a process for the surface treatment of primary particles, characterized in that during the treatment the primary particles are brought into contact with at least one compound of the formula (I)

$$R-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_a-\left[\underset{\underset{R^1}{|}}{\overset{\overset{CH_3}{|}}{Si}}-O\right]_b-\underset{\underset{CH_3}{|}}{\overset{\overset{CH_3}{|}}{Si}}-R \quad (I)$$

where

R identically or differently is $R^1$, methyl or hydroxy, preferably methyl, $R^1$ is identically or differently is a polyether moiety of the formula (III)

$$-Z-(O-C_mH_{2m-(n-1)})_o-[O-(AO)-R^3]_n \quad (III)$$

where

Z is a branched or unbranched alkylene moiety having from 2 to 4 carbon atoms, preferably 3 carbon atoms, m is from 2 to 4, preferably 3, n is from 1 to 3, preferably 1 or 2, with particular preference 1, o is 0 or 1, preferably 0, AO identically or differently is an oxyalkylene moiety comprising oxyethylene, oxypropylene, and/or oxybutylene moieties, $R^3$ identically or differently is hydrogen or an alkyl moiety having from 1 to 4 carbon atoms, with the proviso that in $R^1$ the total number of carbon atoms and oxygen atoms is at least 70, a is from 20 to 200, preferably from 30, from 40, from 50, or from 60 to 170, to 160, to 150, to 140, to 130, to 120, or to 110, and with particular preference from 70 to 100, b is from 1 to 50, preferably from 2, from 3 or from 4 to 30, to 25, or to 20, and with particular preference from 5 to 15, with the proviso that if none of the moieties R is $R^1$, b is at least 3, where the proportion used of the compounds of the formula (I) is from 0.01 to 2% by weight, preferably from 0.05 to 1% by weight, more preferably from 0.1 to 0.8% by weight, still more preferably from 0.2 to 0.6% by weight, and with particular preference from 0.3 to 0.5% by weight, based on the mass of the primary particles to be treated.

The oxyalkylene moiety AO preferably has up to 50% by weight of oxyethylene groups, more preferably up to 40% by weight, particularly preferably up to 35, 30, 25, 20, 15, or 10% by weight, with particular preference up to 5% by weight. The oxyalkylene moiety AO preferably has 0% by weight of oxyethylene groups, more preferably at least 5, 10, 15, 20, 25, or 30% by weight, and in particular at least 35% by weight. Oxyethylene content here is based on the total mass of the moiety $R^1$.

The oxyalkylene moiety AO preferably has from 0 to 50% by weight of oxyethylene groups, preferably from 5 to 35% by weight, more preferably from 15 to 30% by weight, based on the total mass of the moiety $R^1$.

If oxybutylene groups are present, the molar proportion of oxybutylene groups, based on the total number of oxypropylene and oxybutylene groups, is preferably at most 50%, preferably up to 45%, 40%, 35%, 30%, 25%, 20%, 15%, or 10% and in particular up to 5%.

The numerical proportion of unmodified siloxane fragments with the index a is preferably up to 20 times as great as the proportion of polyether-modified siloxane fragments with the index b, preferably up to 20 times, up to 19 times, up to 18 times, up to 17 times, up to 16 times, up to 15 times, up to 14 times, up to 13 times, up to 12 times, up to 11 times, up to 10 times, or up to 9 times, and particularly preferably up to 8 times. The index a is preferably at least 7 times the index b, more preferably at least 8 times, 9 times, 10 times, or 11 times, and in particular at least 12 times, the index b.

The numeric ratio of index a to index b is preferably from 8 to 18, with preference from 9 to 15, and with particular preference from 10 to 12.

The index o is preferably zero.

The fragment with the index o is preferably an unbranched moiety, more preferably an unbranched moiety having 3 carbon atoms. The fragment with the index o is particularly preferably a glyceryl moiety, with particular preference an n-glyceryl moiety which bears the group —O—Z terminally.

The moiety Z is preferably a linear propylene moiety.

The moiety $R^3$ is preferably hydrogen.

The particles of the invention are preferably obtained via surface treatment with compounds of the formula (I), where $R^1$ identically or differently is —$(CH_2)_p$—O—$EO_x$—$PO_y$—$BO_z$—$R^3$, with the proviso that in $R^1$ the total number of carbon atoms and oxygen atoms is at least 70, EO is oxyethylene, PO is oxypropylene, BO is oxybutylene, x is from 0 to 20, preferably from 3 to 15, with particular preference from 4 to 10, y is from 5 to 100, preferably from 8 to 50, with particular preference from 10 to 30, z is from 0 to 20, p is from 2 to 4, preferably 2 and/or 3.

The index x is preferably less than or equal to 1.2, preferably less than 1.1, more preferably less than 1, less than 0.9, less than 0.8, less than 0.7, less than 0.6, less than 0.5, less than 0.4, or less than 0.3 and in particular less than 0.2.

The index x is preferably between 0.05 and 1.2 times the sum of the indices (y+z), preferably between 0.07 and 0.8 times, in particular between 0.1 and 0.5 times.

It is further preferable that the index z is less than or equal to the index y, preferably less than or equal to one half, one third, one quarter, one fifth, one sixth, one seventh, one eighth, or one ninth, and in particular less than or equal to one tenth, of the index y.

An oxybutylene group is preferably linear, i.e. —$(CH_2)_4$—O—, and/or branched, i.e. —$CH(CH_2CH_3)CH_2$—O—.

Particular preference is given to particles surface-treated with a polyethersiloxane of the formula (I), where the moiety R is methyl, and the moiety $R^3$ in formula (III) is hydrogen, and the indices are as follows:

a is from 80 to 95, b is from 5 to 8, x is from 3 to 5, y is from 10 to 25, and z is 0.

For the purpose of the invention polyethersiloxanes are compounds of the formula (I).

The structure of the fragments of the formulae (I), (II) and (III), and of the fragments AO and $R^1$ can be random.

Random distributions are composed of blocks with any desired number of blocks and with any desired sequence, or randomized distribution; they can also have an alternating structure, or else form a gradient along the chain; in particular, they can also constitute any of the mixed forms in which groups of different distributions can optionally follow one another. The nature of specific embodiments can result in restrictions to the random distributions. In all regions unaffected by the restriction there is no change to the random distribution.

An advantage of the particles surface-treated in the invention is reduced susceptibility to dusting in comparison with pigments of the prior art which have been treated by way of example with silicone oil. Dust emissions during further processing are therefore reduced. Possible dust explosions are moreover prevented.

Another advantage of the particles of the invention is that in accordance with current regulatory systems, for example the European standard EC 10/2011 and/or standards of the American FDA, they are not subject to any restriction in respect of their use in food packaging.

Another advantage of the particles of the invention and compositions of the invention is that pressure filter values are reduced in comparison with the prior art. This increases the service lifetimes of the processing equipment, in particular the extruder, and shortens the associated cleaning cycles.

Another advantage is good dispersion, for avoidance of fiber breakages and/or specks of undispersed material in the products.

It is likewise advantageous that the particles of the invention and the compositions of the invention have high thermal stability.

The compositions of the invention are advantageous in comparison with the prior art because a marked increase in tensile strength and impact resistance of plastics moldings can be observed.

Another advantage of the particles of the invention is their powder-flowability, which is particularly apparent during the unloading of big bags and silo vehicles during the further processing of the particles, or during the direct use of the particles during metering by way of pneumatic systems and powder screws into the processing assembly (e.g. extruder or kneader).

Another advantage of the particles of the invention is that compositions can be formulated in many different ways. This is apparent in that the compositions can be formulated on the basis of thermoplastics, thermosets, and plasticizers. This provides, for the further-processing industry, e.g. paste producers, compounders, and masterbatch manufacturers, the advantage that it is not necessary to subject the particles of the invention to further modifications before they are used. This provides a financial advantage, and flexibility of formulation.

Any of the crystalline forms of titanium dioxide, of barium sulfate, and of zinc sulfide is suitable as primary particle for the production of the particles of the invention.

Examples here in the case of titanium dioxide are polymorphic forms, rutile, anatase, or brookite. The titanium dioxide can be produced by various methods known in the prior art. It is also possible in the invention to use various hydrated forms of titanium dioxide. Titanium dioxide is approved as white pigment as E171 in the food additives Regulation 231/2012/EC, and also as CI 77891 in accordance with the cosmetic products Regulation EC 1223/2009. Terms used for barium sulfate used in the invention are heavy spar, baryte, baryte white, and blanc fixe. The various crystalline forms of zinc sulfide are used in the invention: the alpha form of zinc sulfide, occurring naturally as wurtzite, and/or the beta form of zinc sulfide, occurring naturally as zincblende and sphalerite.

Mixtures of the pigments mentioned can moreover be surface-treated in the invention. The mixtures can arise via mixing of the pigments previously produced in pure form, or via coprecipitation, in particular in the form of lithopones. For the purposes of the invention, these mixtures are likewise primary particles.

In one preferred embodiment, inorganically modified titanium dioxide is used. The surface is treated by grinding the $TiO_2$ starting material, and then coating with one or more layers of inorganic substances. The substance to be precipitated here is initially added in dissolved form. To this end it is necessary to set, in the suspension, a pH at which the inorganic substance does not yet precipitate as solid. The inorganic substance is then precipitated from this suspension via a pH change toward the neutral point. Materials used in this treatment are the oxides and, respectively, the hydroxides of aluminum, of silicon, of zirconium, and also of titanium (J. Winkler, Titandioxid [Titanium dioxide], (2003), chapter 3.4, pp. 38-41, ISBN 3-87870-738-X). After this treatment, the surface of the titanium dioxide particles has been modified in such a way that the particles are composed of at most 99% by weight of titanium dioxide, preferably at most 95% by weight, with particular preference at most 85% by weight, based on the total mass of the particle. It is further preferable that the particles are composed of at least 80% by weight, preferably at least 85% by weight, particularly preferably at least 90% by weight, of titanium dioxide, based on the total mass of the particles. The titanium dioxide particles thus inorganically treated are likewise primary particles for the purposes of the invention.

Preferred particles are titanium dioxide particles, optionally inorganically modified.

It is preferable that the surface treatment of the invention increases the packing density of the particles, which then becomes discernible in reduced bulk height, and also improved flowability.

It is preferable that the particles surface-treated in the invention exhibit reduced susceptibility to dusting. It is particularly preferable that the reduction of susceptibility to dusting is, in comparison with silicone-treated particles, at least 13%, preferably 21%, more preferably 25%, and with particular preference at least 30%.

Susceptibility to dusting can be determined in what is known as a dust chamber. A defined quantity of particles, e.g. 100 g, is subjected here to free fall in a vertical tube in the atmosphere of the environment. The particles settle in the atmosphere on the base of a cylinder, while a portion remains as dust in the gas phase of the free-fall space. The volume situated above the sediment is removed by suction, and during this process the dust present is removed by filtration. The quantity of dust is determined by weighing of the filter.

The mass of dust generated by the particles of the invention is preferably less than 80 mg/100 g, particularly preferably less than 65 mg/100 g, and with particular preference less than 50 mg/100 g.

Powder-flowability can be determined with, for example, a RST-XS ring shear tester (D. Schulze, Pulver und Schüttgüter [Powders and flowable solids], Springer, 2006, chapter 3.1.4, p. 42). For this, the sample of flowable solid is subjected from above to a force (normal force) of 3.5 kPa in a test cell. During the measurement the shear cell rotates slowly ($\omega$). This results in a shear deformation of the sample of flowable solid.

The force required ($F_1$ and $F_2$) is measured. The flowability $ff_c$ of the flowable solid is determined from the ratio of consolidation stress $\sigma_1$ to yield strength $\sigma_c$. The greater the flowability $ff_c$, the better the flow of the flowable solid.

The powder-flowability of the particles of the invention is preferably greater than 1.5. Powder-flowability can be determined by a method based on ASTM D6773-08.

The dispersibility of the particles surface-treated in the invention can be determined and evaluated on the basis of the pressure rise in front of a filter (with mesh width to be stated) arising during extrusion of a polymer melt through a screen pack (pressure filter value). The test can by way of example be carried out by a method based on DIN EN 13900-5:2005.

The pressure filter value (14 µm) of the compositions of the invention in the form of masterbatches is preferably up to 1.2 bar*cm²/g, more preferably up to 1.0 bar*cm²/g, and in particular up to 0.8 bar*cm²/g. The pressure filter values here can be determined as described in the examples.

Another possibility for assessing dispersibility consists in determination and evaluation of the number of agglomerates in a flat film. Agglomerates here are discernible here as specks of undispersed material. The number of specks of undispersed material should be minimized.

Another possibility for assessing dispersibility consists in determination of the fineness of the particles of the invention, e.g. in a white paste under defined dispersion conditions. An example of equipment suitable for this purpose is a grindometer, for example of Hegman type. The determination can by way of example be carried out in accordance with DIN EN 21524 (corresponding to ISO 1525). The particles of the invention should be as fine as possible, preferably smaller than 20 µm, particularly preferably smaller than 18 µm, in particular smaller than 16 µm, but the particles should not be smaller than 0.1 µm, preferably not smaller than 1 µm.

The invention further provides the use of the particles of the invention for the production of polymer compositions.

The particles of the invention are preferably used for the production of compositions.

The use of the polymer compositions comprising the particles of the invention for processing to give plastics moldings or plastics films.

The invention further provides compositions comprising at least one polymer and at least particles of the invention.

The compositions of the invention comprise, alongside the particles of the invention, at least one polymer.

Preferred polymers of the compositions of the invention are thermosets or thermoplastics. Examples of suitable thermosets are unsaturated polyester resins (UP), phenolic resins, melamine resins, formaldehyde molding compounds, vinyl ester resins, diallyl phthalate resins, silicone resins or urea resins. Examples of suitable thermoplastic materials are polyethylene, polypropylene, polyesters, polyamide, PET, polystyrene, its copolymers and blends, polycarbonate, PMMA, and polyvinyl chloride.

The compositions of the invention comprising thermoplastics are preferably processed to give masterbatches and/or plastics films.

The compositions are preferably processed to give masterbatches, plastics moldings, and/or plastics films.

It is further preferable that the compositions of the invention comprising thermosets are processed to give plastics moldings.

It is further preferable that the tensile strength of plastics moldings of the invention is improved, i.e. appropriately increased, by at least 10% in comparison with the prior art (comprising silicone-oil-treated particles). It is further preferable that impact resistance is improved, i.e. correspondingly increased, by at least 10%, preferably at least 15%, with particular preference at least 20%, in comparison with the prior art (comprising silicone-oil-treated particles).

The tensile strength of the thermoset plastics moldings of the invention, based on polyester, is preferably more than 70 MPa.

The impact resistance of the thermoset plastics moldings of the invention, based on polyester, is preferably more than 50 kJ/m².

It is in particular preferable that the plastics moldings of the invention based on polyester exhibit an improvement not only of tensile strength but also of impact resistance of at least 10%, where the absolute values for tensile strength have been improved to more than 70 MPa, and those for impact resistance have been improved to more than 50 kJ/m².

Processes for processing the compositions of the invention can preferably be carried out in the temperature range from 5 to 300° C., particularly preferably from 25 to 250° C., and with particular preference from 50 to 200° C., without any adverse effect on properties.

The particles of the invention can in principle be produced by the processes of the prior art, but they are preferably produced via the process described below.

The invention further provides a process for the surface treatment of $TiO_2$, $BaSO_4$, ZnS, and/or lithopone particles, in which during the treatment the primary particles are brought into contact with at least one compound of the formula (I)

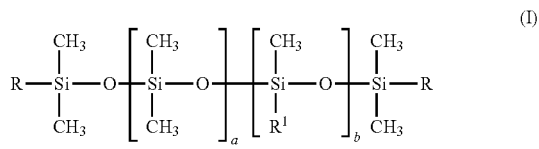

where
R identically or differently is $R^1$, methyl, or hydroxy, preferably methyl,
$R^1$ identically or differently is a polyether moiety of the formula (III)

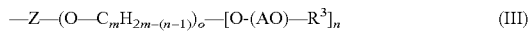

where
Z is a branched or unbranched alkylene moiety having from 2 to 4 carbon atoms,
m is from 2 to 4, preferably 3,
n is from 1 to 3, preferably 1 or 2, with particular preference 1,
o is 0 or 1, preferably 0,
AO identically or differently is an oxyalkylene moiety comprising oxyethylene, oxypropylene, and/or oxybutylene moieties,
$R^3$ identically or differently is hydrogen or an alkyl moiety having from 1 to 4 carbon atoms,
with the proviso that in $R^1$ the total number of carbon atoms and oxygen atoms is at least 70,
a is from 20 to 200,
b is from 1 to 50,
with the proviso that if none of the moieties R is $R^1$, b is at least 3,
where the proportion used of the compounds of the formula (I) is from 0.01 to 2% by weight, preferably from 0.05 to 1% by weight, more preferably from 0.1 to 0.8% by weight, still more preferably from 0.2 to 0.6% by weight, and with particular preference from 0.3 to 0.5% by weight, based on the mass of the primary particles to be treated.

Further preferences in relation to the surface-treatment agents of the formula (I) have already been stated above.

The surface treatment of the primary particles can be carried out under dry or wet conditions, and the wet embodiment is preferably implemented in emulsion. If the surface treatment is carried out with an emulsified polyethersiloxane of the formula (I), emulsifiers can be added here.

When the polyethersiloxanes of the formula (I) are prepared as emulsions, preference is given to oil-in-water emulsions comprising from 5 to 70% by weight of polyethersiloxanes, from 1 to 20% by weight of emulsifiers, and from 20 to 94% by weight of water. Processes for the production of silicone emulsions are known to the person skilled in the art. Production is usually achieved via stirring all components and optionally subsequently homogenizing with jet dispersers, rotor-stator or rotor-rotor homogenizers, colloid mills, or high pressure homogenizers. Methods for production of emulsion are described by way of example in EP0093310, DE2555048, EP1132417.

It is possible here to use any of the emulsifiers that are known to the person skilled in the art for the production of polysiloxane emulsions, examples being anionic, cationic, amphoteric, and nonionic emulsifiers.

The following are examples of anionic emulsifiers, which however are not restricted thereto: Alkyl sulfates, in particular having from 8 to 22 carbon atoms in the alkyl group, alkyl and alkylaryl ether sulfates having from 8 to 22 carbon atoms in the alkyl group, and from 1 to 40 oxyethylene or oxypropylene units. Sulfonates, in particular alkylsulfonates having from 8 to 22 carbon atoms, alkylarylsulfonates having from 8 to 22 carbon atoms, mono- and diesters of sulfosuccinates, salts of carboxylic acids having from 8 to 22 carbon atoms in the alkyl, aryl, alkaryl, or aralkyl unit. Phosphoric mono- and diesters, and salts of these, in particular alkyl and alkaryl phosphates having from 8 to 22 carbon atoms in the organic unit, and alkyl ether phosphates and alkaryl ether phosphates having from 8 to 22 carbon atoms in the alkyl or alkaryl unit and from 1 to 40 oxyethylene units. As is well known in the field of emulsifiers, the counterions in anionic emulsifiers can be alkali metal cations, ammonium or protonated substituted amines, for example those of trimethylamine or of triethanolamine. Preference is normally given to ammonium ions, sodium ions, and potassium ions.

The following are examples of cationic emulsifiers, which however are not restricted thereto: Salts of primary, secondary and tertiary fatty amines having from 8 to 24 carbon atoms with acetic acid, sulfuric acid, hydrogen chloride, and phosphoric acids.

Quaternary alkyl- and alkylphenylammonium salts, in particular those which have from 6 to 24 carbon atoms, specifically the corresponding halides, sulfates, phosphates, and acetates. Alkylpyridinium, alkylimidazolinium, and alkyloxazolinium salts, in particular those having an alkyl chain of up to 18 carbon atoms, specifically the corresponding halides, sulfates, phosphates, and acetates.

Amphoteric emulsifiers that can be used are: Amino acids with long-chain substituents, for example salts of N-alkyldi(aminoethyl)glycine or of N-alkyl-2-aminopropionic acid. Betaines, for example N-(3-acylamidopropyl)-N,N-dimethylammonium salts with an acyl radical having from 8 to 20 carbon atoms.

The following are examples of nonionic emulsifiers, which however are not restricted thereto: Polyoxyethylene condensates of fatty acids or of fatty alcohols having from 8 to 22 carbon atoms with up to 95% by weight oxyethylene content, based on the molar mass of the emulsifier; polyoxyethylene derivatives of phenols having from 6 to 20 carbon atoms on the aromatic system, and up to 95 percent oxyethylene content; oxyethylene condensates of fatty acid monoesters of glycerol having from 10 to 22 carbon atoms and up to 95 percent oxyethylene; sorbitan esters of fatty acids having from 10 to 22 carbon atoms; polyoxyethylene sorbitan esters of fatty acids having from 10 to 22 carbon atoms; ethoxylated amides, ethoxylated amines, alkoxylated polysiloxanes, block copolymers of propylene oxide, of ethylene oxide, and/or of other epoxides.

The abovementioned fatty structures usually represent the lipophilic portion of the emulsifiers. A usual fatty group is an alkyl group of natural or synthetic origin. Known unsaturated groups are the oleyl, linoleyl, decenyl, hexadecenyl, and dodecenyl moieties. Known saturated groups are lauryl, stearyl, myristyl, and palmityl moieties. Alkyl groups here can be cyclic, linear, or branched.

The emulsification process can use one emulsifier or a mixture of a plurality of different emulsifiers, and it is preferable here that the mixture comprises at least one nonionic emulsifier, for example ethoxylated fatty acids, ethoxylated linear or branched fatty alcohols, sorbitan fatty acid esters, or ethoxylated sorbitan fatty acid esters.

Known compounds can moreover be added as thickeners, examples being polyacrylic acid, polyacrylates, cellulose ethers such as carboxymethylcellulose and hydroxyethylcellulose, natural gums such as xanthan gum, and polyurethanes, and preservatives, and other customary additives known to the skilled person can be added to the emulsions.

The particles in the process of the invention can be surface-treated in a single-stage or two-stage process. In the two-stage process, the primary particles are mixed in the first stage with the polyethersiloxane of the formula (I). It is preferable to use a Lödige mixer.

The first stage is preferably carried out at room temperature or temperatures up to 60° C.

In the second stage the particles from the first stage are milled. Preferred mills are steam-jet mills, pin mills, air-jet mills, roll mills, or tubular ball mills, particular preference being given to a steam-jet mill.

The milling can be achieved at atmospheric pressure, or at increased pressure of up to 20 bar, preferably up to 19 bar, 18 bar, 17 bar, 16 bar, 15 bar, 14 bar, 13 bar, 12 bar, 11 bar, 10 bar, 9 bar, 8 bar, 7 bar, 6 bar, 5 bar, 4 bar, 3 bar, or up to 2 bar.

In the second step of the process of the invention, the particles are preferably milled in a steam-jet mill at a pressure of from 8 to 20 bar, preferably from 10 to 19 bar, more preferably from 12 to 18 bar.

The polyethersiloxanes on which the invention is based can be produced via noble-metal-catalyzed hydrosilylation of the linear or branched hydrosiloxanes of the formula (II)

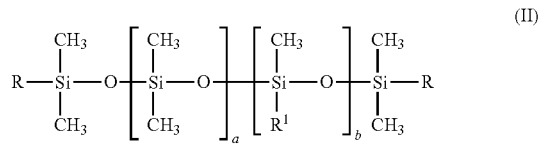

(II)

R identically or differently is $R^1$, methyl, or hydroxy, preferably methyl, $R^1$ is hydrogen, where the definitions of the moieties and indices are those mentioned above, with terminally unsaturated polyethers, as for example described in EP1520870.

The polyethers to be hydrosilylated comply with the formula (IIIa)

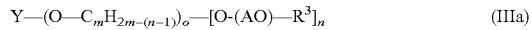

$Y-(O-C_mH_{2m-(n-1)})_o-[O-(AO)-R^3]_n$  (IIIa)

with the above definitions and preferences for the moieties and indices, where the moiety Y has terminal unsaturation, preferably with a C=C double bond, more preferably having allylic unsaturation in relation to the oxygen, in particular being an allyl ether.

In one particular embodiment, the polyethers can be produced by using starter alcohols which lead to branched polyethers which then have two or more oxyalkylene chains. Starter alcohols might be trimethylolpropane monoallyl ether or the glycerol monoallyl ethers. Preference is given in the invention to glycerol monoallyl ethers, in particular terminally allylically substituted glycerol monoallyl ether.

The hydrosiloxanes used in the production of the polyethersiloxanes can be produced as in the prior art, for example in EP1439200. The unsaturated polyethers used can be produced by starting from unsaturated starter alcohols by the alkaline alkoxylation processes known from the literature, or with use of DMC catalysts as in the prior art, for example as described DE102007057145.

The particles of the invention, the compositions of the invention comprising the particles of the invention, and also the inventive use of the particles and of compositions thereof, and moreover the process of the invention for the production of the particles are described by way of example below, without any intention that the invention be restricted to these examples of embodiments. Where ranges, general formulae, or classes of compound are stated below, these are intended to comprise not only the corresponding ranges or groups of compounds explicitly mentioned, but also all subranges and subgroups of compounds which can be obtained by extracting individual values (ranges) or compounds. Where documents are cited for the purposes of the present description, the entire content of these is intended to be part of the disclosure of the present invention. Where % data are provided below, unless otherwise stated these are % by weight data. In the case of compositions, the % data are based on the entire composition unless otherwise stated. Where average values are stated below, unless otherwise stated these are mass averages (weight averages). Where measured values are stated below, unless otherwise stated these measured values were determined at a pressure of 101 325 Pa and at a temperature of 25° C.

EXAMPLES

General Methods and Materials

Figure 1:
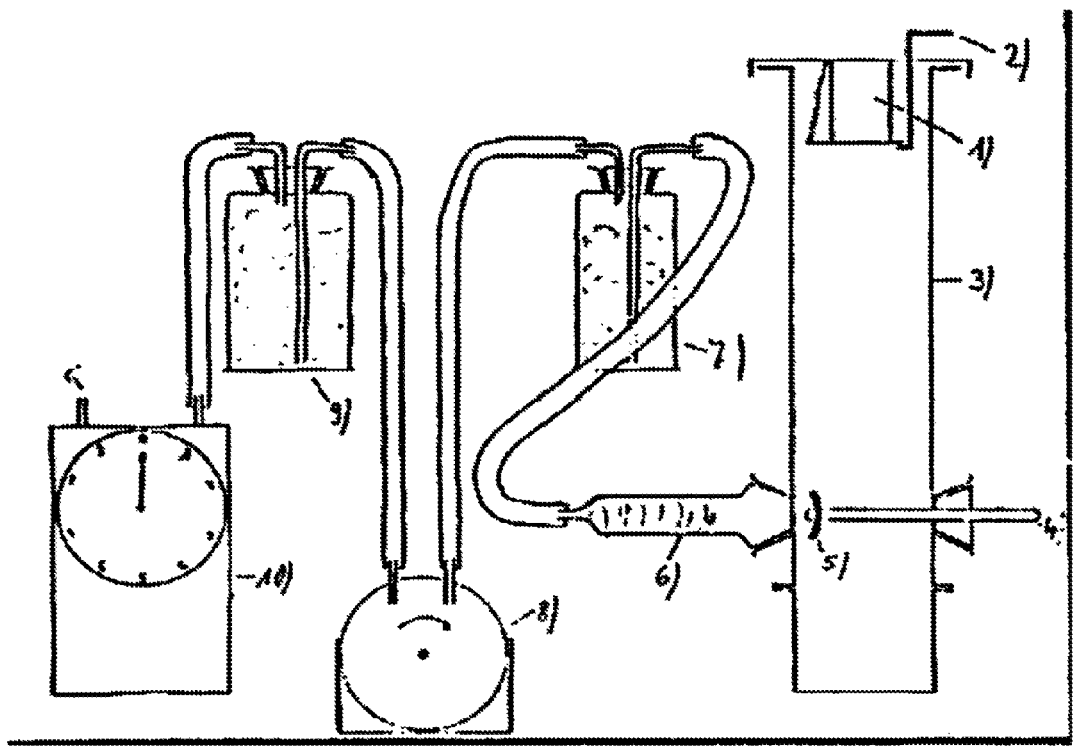
FIG. 1: The figure shows the principle of the dusting chamber, the mode of functioning of which is described in detail in example 3 in E1. The meanings of the numerals are as follows: 1) Drop box, 2) unlocking lever, 3) glass cylinder, 4) slide, 5) rubber seal, 6) sample tube (packed with quartz wool), 7) & 9) wash bottle (packed with quartz wool), 8) vacuum pump, 10) gas meter; the letter G at the outlet of the gas meter indicates the outlet for the gas removed by suction.
Figure 2:
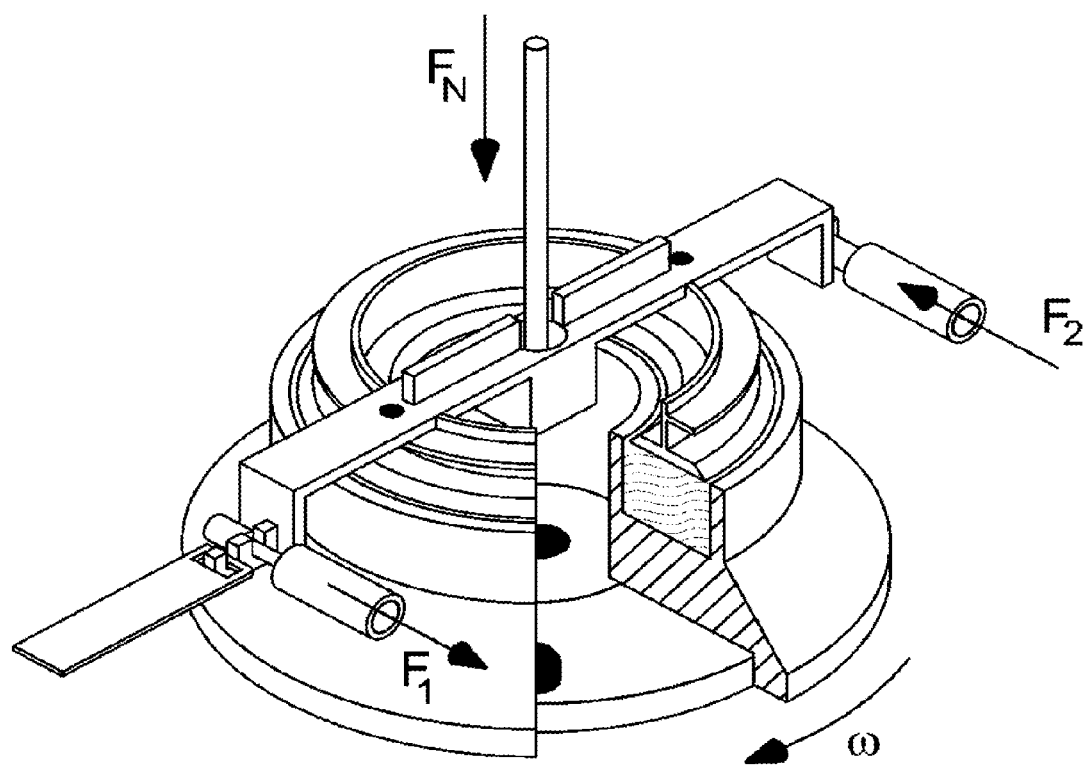
FIG. 2: The figure shows the principle of the measurement cell of the RST-XS ring-shear tester, the mode of functioning of which is described in detail in example 4 in E6: ω: Rotation of measurement cell, $F_1$ and $F_2$: forces for retaining the cover of the measurement cell, $F_N$: normal force exerted by the cover on the measurement cell.

| | | |
|---|---|---|
| Lupolen Purell 1800 SP 15 | Low-density polyethylene | Lyondell Basell |
| Palapreg P17-02 | Polyester resin | DSM |
| Palapreg H814-01 | Polyester resin | DSM |
| TEGOMER DA626 | | Evonik Industries AG |
| TEGOMER M-Si2650 | | Evonik Industries AG |
| Trigonox C | | AkzoNobel Polymers |
| Millicarb OG | | Omya |
| Coathylene HA 1681 | | DuPont |
| Dioctyl phthalate (DOP) | | BASF |
| Methylisothiazolinone (MIT) | | Thor Chemie |

Viscosity:

Viscosities were determined by using a Brookfield LV-DV-I+ spindle viscometer. Brookfield viscometers are rotary viscometers with defined spindle sets as rotary bodies. The rotary bodies used were from an LV spindle set. Because the viscosity is temperature-dependent, the temperatures of viscometer and test liquid were kept precisely constant to +/−0.5° C. during measurement. Other equipment used in addition to the LV spindle set were a thermostatable water bath, a 0 to 100° C. Thermometer, and a timer (scale values no greater than 0.1 second). For the measurement, 100 ml of the sample were charged to a wide-necked flask; the measurement was made under temperature-controlled conditions and in the absence of air bubbles, after prior calibration. The viscosity determination was carried out by positioning the viscometer in relation to the sample in such a way that the spindle was immersed in the product up to the mark. Measurement is initiated by using the start key, and care was taken here that measurement was made within the advantageous measurement range of 50% (+/−20%) of the maximal measurable torque; in other circumstances it was necessary to use an appropriate spindle. The measurement result was displayed in mPas on the viscometer display, whereupon division by the density (g/ml) gives the viscosity in the unit [mm$^2$/s].

Spectroscopic Analyses:

The recording and interpretation of NMR spectra is known to the person skilled in the art. A reference that may be mentioned is the book "NMR Spectra of Polymers and Polymer Additives", A. Brandolini and D. Hills, 2000, Marcel Dekker, Inc. The spectra were recorded by using a Bruker Spectrospin spectrometer at room temperature, the measurement frequency being 399.9 MHz for recording the proton spectra, 100.6 MHz for recording the $^{13}$C spectra, and 79.5 MHz when recording the $^{29}$Si spectra.

Determination of molar masses, in particular of weight-average molar masses Mw:

The gel permeation chromatographic analyses (GPC) were carried out by using a Hewlett-Packard 1100 instrument, using an SDV column combination (1000/10000 Å, each 65 cm, internal diameter 0.8 cm, temperature 30° C.), THF as mobile phase with flow rate 1 ml/min and RI detector (Hewlett-Packard). The system was calibrated against a polystyrene standard in the range from 162 to 2 520 000 g/mol.

Determination of SiH Content:

The SiH values of the hydrogen siloxanes used, and also those of the reaction matrices, are determined in each case using a gas volumetric method by the butanolate-induced decomposition of weighed aliquots of samples, using a gas burette. When the hydrogen volumes measured are inserted into the general gas equation, they allow determination of content of active SiH functions in the starting materials, and also in the reaction mixtures, and thus allow monitoring of conversion. A 5% by weight sodium butanolate solution was used.

Example 1

Synthesis

The polyethers used (table 1, PE) have, at the chain ends, respectively an allyl ether (PE1-PE8) or vinyl ether function (PE9) and a hydroxy group (PE1-PE9), and are characterized by different mass contents of oxyethylene, oxypropylene, and oxybutylene (EO/PO/BO mass contents, based on the polyether moiety without allyl/vinyl group) and molar masses (Mw). The vinyl polyether PE9 has an oxybutylene moiety as fragment with the index o according to formula (III), in this case —O—(CH$_2$)$_4$—.

Glycerol monoallyl ether, used in the polyether PE10, and trimethylolpropane monoallyl ether, used in the polyether PE11.

TABLE 1

Composition of the polyethers used

| Polyether | PO [% by wt.] | EO [% by wt.] | BO [% by wt.] | Mw [g/mol] |
|---|---|---|---|---|
| PE1 | 77 | 23 | | 1057 |
| PE2 | 80 | 20 | | 518 |
| PE3 | 100 | 0 | | 414 |
| PE4 | 68 | 32 | | 1417 |
| PE5 | 88 | 12 | | 1336 |
| PE6 | 72 | 28 | | 1219 |
| PE7 | 90 | 10 | | 1180 |
| PE8 | 80 | 10 | 10 | 1194 |
| PE9 | 83 | 10 | 7 | 1194 |
| PE10 | 90 | 10 | | 1248 |
| PE11 | 90 | 10 | | 1298 |

The hydrosiloxanes used (table 2, SiH), are characterized by different SiH contents and viscosities.

TABLE 2

Properties of the hydrosiloxanes used

| Hydrosiloxane | SiH content, [mmol/g] | Viscosity, 25° C., [mPa*s] |
|---|---|---|
| SH1 | 2.29 | 116 |
| SH2 | 0.90 | 159 |
| SH3 | 1.40 | 61 |
| SH4 | 3.52 | 101 |

The polyether-modified siloxanes (table 3, O) were produced by means of hydrosilylation by the following process.

The hydrosiloxane SiH used and the hydroxy-functional terminally unsaturated PE used were charged in a ratio of 1.35 mol of allyl/vinyl polyether per molar equivalent of SiH in a 500 ml four-necked flask with stirrer with precision glass gland, reflux condenser, and internal thermometer, and heated to 70° C., with stirring. 5 ppm of platinum in the form of Pt$_2$(divinyltetramethyldisiloxane)$_3$ complex (Karstedt catalyst, 1.5% Pt in deca-methylcyclopentasiloxane) were added with a syringe. Conversion determined by a gas volumetric method was quantitative within from 1 to 3 hours of continued reaction time at from 70-80° C. Filtration gave clear, viscous liquids of yellow-brownish color.

TABLE 3

Siloxanes produced as in example 1; the mixture cited in O13 is an equimolar mixture of the polyethers listed

| Example | Hydrosiloxane | Polyether |
|---|---|---|
| O1 | SH2 | PE1 |
| O2 | SH2 | PE5 |
| O3 | SH1 | PE1 |
| O4 | SH2 | PE3 |
| O5 | SH2 | PE6 |
| O6 | SH3 | PE1 |
| O7 | SH4 | PE2 |
| O8 | SH1 | PE2 |
| O9 | SH4 | PE3 |
| O10 | SH4 | PE1 |
| O11 | SH2 | PE4 |
| O12 | SH2 | PE7 |

TABLE 3-continued

Siloxanes produced as in example 1; the mixture cited in O13 is an equimolar mixture of the polyethers listed

| Example | Hydrosiloxane | Polyether |
|---|---|---|
| O13 | SH4 | PE1 + PE5 |
| O14 | SH2 | PE8 |
| O15 | SH2 | PE9 |
| O16 | SH2 | PE10 |
| O17 | SH2 | PE11 |

Example 2

Emulsions 185 g of O12 were added within 20 minutes with cooling, under conditions of shear (Mizer disc, 2000 rpm) to an emulsifier solution made of 40 g of an ethoxylated stearic acid with HLB value of about 18.8 and 60 g of demineralized water. The mixture was then subjected to shear for a further 20 minutes. This gave a paste with increased viscosity. 214 g of demineralized water were then added within 10 minutes under conditions of shear. This gave a white emulsion with about 45% by weight solids content. Finally 0.15% of an aqueous solution of 20% by weight of methylisothiazolinone (MIT) was added to preserve the emulsion.

Example 3

Surface Treatment of Particles

V1: Dry-phase Treatment of $TiO_2$ Particles

Starting material for the dry surface treatment of titanium dioxide with polyethersiloxanes was a $TiO_2$ in rutile form with an inorganic modification system made of silicon oxide and aluminum oxide. The quantity stated in table 4 of polyethersiloxane (surface treatment agent) was admixed with said powder, and the mixture was homogenized for 60 seconds in a Lödige mixer. The polyethersiloxane-wetted $TiO_2$ was then dry-milled in a steam-jet mill using steam at 18 bar. The milling can alternatively be achieved by means of a pin mill, air-jet mill, roll mill, or tubular ball mill.

V2: Liquid-phase Treatment of $TiO_2$ Particles

Starting material for the wet surface treatment of $TiO_2$ with polyethersiloxanes was a $TiO_2$ filter cake after inorganic modification, where the $TiO_2$ was in the rutile modification, and the inorganic modification system was made of silicon dioxide and aluminum oxide. Said filter cake was redispersed in water by means of a dissolver, and the quantity stated in table 4 of polyethersiloxane emulsion as in example 2 was added to the suspension. Said suspension was spray-dried, and then the spray-dried grains were dry-milled with the aid of a steam-jet mill using steam at 18 bar.

V3: Dry-phase Treatment of $BaSO_4$ Particles

Starting material for the dry surface treatment of barium sulfate with polyethersiloxanes was a barium sulfate precipitated by a chemical reaction in the liquid phase (known as blanc fixe) which had not yet been dry-milled, i.e. by way of example steam-jet-milled. The quantity stated in table 4 of polyethersiloxane was admixed with said powder, and the mixture was homogenized for 60 seconds in a Lödige mixer. The polyethersiloxane-wetted $BaSO_4$ was then dry-milled in a steam-jet mill using steam at 10 bar. The milling can alternatively be achieved by means of a pin mill, air-jet mill, roll mill, or tubular ball mill.

V4: Dry-phase Treatment of ZnS Particles

Starting material for the dry surface treatment of zinc sulfide with polyethersiloxanes was a zinc sulfide precipitated by a chemical reaction in the liquid phase (known as Sachtolith) which had not yet been dry-milled, i.e. by way of example steam-jet-milled. The quantity stated in table 4 of polyethersiloxane was admixed with said powder, and the mixture was homogenized for 60 seconds in a Lödige mixer. The polyethersiloxane-wetted ZnS was then dry-milled in a steam-jet mill using steam at 10 bar. The milling can alternatively be achieved by means of a pin mill, air-jet mill, roll mill, or tubular ball mill.

V5: Dry-phase Treatment of Lithopone Particles

Starting material for the dry surface treatment of lithopone with polyethersiloxanes was lithopone which had been produced by coprecipitation of $BaSO_4$ and ZnS in a chemical reaction from a liquid phase, and which had not yet been dry-milled, i.e. by way of example steam-jet-milled. The quantity stated in table 4 of polyethersiloxane was admixed with said powder, and the mixture was homogenized for 60 seconds in a Lödige mixer. The polyethersiloxane-wetted lithopone was then dry-milled in a steam-jet mill using steam at 10 bar. The milling can alternatively be achieved by means of a pin mill, air-jet mill, roll mill, or tubular ball mill.

The particles P4, P7, P8, P9, P16, P18, P20, P21, P23, P24, P25, P26, P27, and P31 listed in table 4 are not of the invention. P25A are titanium dioxide particles with inorganic posttreatment which have been steam-jet-treated, without any organic surface treatment or surface treatment of the invention. P25B are titanium dioxide particles with inorganic posttreatment which have been steam-jet-treated, with silicone oil surface treatment. P26 are commercially available rutile pigments for plastics applications, produced by the sulfate process, source: Europe

TABLE 4

$TiO_2$, $BaSO_4$, ZnS, and lithopone particles which were surface-treated by the processes of example 3, AS: commercial alkylsiloxane from Evonik Industries AG TMP: trimethylolpropane from BASF Quantity: % by weight of treatment agent, based on mass of particles without surface treatment of the invention.

| Particle | Method | Surface-treatment agent | Quantity |
|---|---|---|---|
| P1 | V1 | O1 | 0.42 |
| P2 | V1 | O2 | 0.43 |
| P3 | V1 | O3 | 0.46 |
| P4 | V1 | O4 | 0.34 |
| P5 | V1 | O5 | 0.42 |
| P6 | V1 | O6 | 0.42 |
| P7 | V1 | O7 | 0.44 |
| P8 | V1 | O8 | 0.44 |
| P9 | V1 | O9 | 0.48 |
| P10 | V1 | O10 | 0.46 |
| P11 | V1 | O11 | 0.42 |
| P12A | V1 | O12 | 0.40 |
| P12B | V1 | O12 | 0.20 |
| P12C | V1 | O12 | 0.80 |
| P13 | V1 | O13 | 0.42 |
| P14 | V2 | O3 | 0.40 |
| P15 | V2 | O5 | 0.40 |
| P16 | V2 | O7 | 0.43 |
| P17 | V3 | O12 | 0.42 |
| P18 | V3 | TMP | 0.35 |
| P19 | V4 | O12 | 0.45 |
| P20 | V4 | AS | 0.45 |
| P21 | V4 | TMP | 0.35 |
| P22 | V5 | O12 | 0.42 |
| P23 | V5 | AS | 0.45 |
| P24 | V5 | TMP | 0.35 |

TABLE 4-continued

TiO$_2$, BaSO$_4$, ZnS, and lithopone particles which
were surface-treated by the processes of example 3,
AS: commercial alkylsiloxane from Evonik Industries AG
TMP: trimethylolpropane from BASF
Quantity: % by weight of treatment agent, based on mass of
particles without surface treatment of the invention.

| Particle | Method | Surface-treatment agent | Quantity |
|---|---|---|---|
| P25A |  | none | 0 |
| P25B | V1 | silicone oil | 0.41 |
| P26 |  | silicone oil | 0.4 to 0.5 |
| P27 | V1 | AS | 0.40 |
| P28 | V1 | O14 | 0.40 |
| P29 | V1 | O15 | 0.40 |
| P30 | V1 | O16 | 0.40 |
| P31 | V1 | O17 | 0.40 |

Example 4

Determination of Properties of the Surface-treated Particles

E1: Determination of Dusting:

100 g of the substance to be tested was weighed into the drop box 1) in an apparatus as shown in FIG. 1. The drop box was locked by using the lever 2), and suspended in the glass cylinder 3) (height 800 mm, diameter 150 mm). Quartz wool was charged to the sample tube 6), which was weighed and inserted into the glass cylinder 3). One end of the sample tube 6) was sealed by way of the slide 4). The other end was connected by way of a wash bottle 7) filled with quartz wool via a vacuum hose to a vacuum pump 8). A gas meter was attached by way of another safety bottle 9) filled with quartz wool.

The drop box 2) was unlocked. The sample dropped into the glass cylinder, and dusting occurred. Ten seconds after the unlocking procedure, the rubber seal 5) was removed from the inlet of the sample tube by means of the slide 4). The drop box is carefully removed. 20 sec. after opening of the slide, the vacuum pump was started, and precisely 20 l of air were sucked through the glass cylinder, the top of which was open. The performance of the vacuum pump was 10 l/min. Once the vacuum pump had been switched off, the weighed sample tube 6) was removed, and again weighed. The weight difference in [mg/100 g] of powder has been stated as measure of dusting. The determination used two measurements. Table 5 states the average values of said measurements.

TABLE 5

Determination of dusting in example 4 for the surface-treated particles from example 3

| Particle | Mass of dust [mg/100 g] |
|---|---|
| P1 | 33 |
| P2 | 29 |
| P3 | 46 |
| P4 | 120 |
| P5 | 68 |
| P6 | 59 |
| P7 | 95 |
| P8 | 86 |
| P9 | 86 |
| P10 | 37 |
| P11 | 46 |

TABLE 5-continued

Determination of dusting in example 4 for the surface-treated particles from example 3

| Particle | Mass of dust [mg/100 g] |
|---|---|
| P12A | 61 |
| P12B | 36 |
| P12C | 75 |
| P13 | 45 |
| P14 | 51 |
| P15 | 63 |
| P16 | 77 |
| P17 | 8 |
| P18 | 84 |
| P19 | 45 |
| P20 | 96 |
| P21 | 89 |
| P22 | 17 |
| P23 | 88 |
| P24 | 95 |
| P25A | 12 |
| P25B | 87 |
| P26 | 95 |
| P27 | 98 |
| P28 | 14 |
| P29 | 45 |
| P30 | 29 |
| P31 | 76 |

The dust mass for the particles not of the invention is more than 80 mg/100 g.

E6: Powder-flowability

Powder-flowability is determined by using an RST-XS ring-shear tester. The sample of flowable solid is charged to the measurement cell and loaded from above, by way of a cover, with a force (normal force) of 3.5 kPa. During the measurement the shear cell rotates slowly ($\omega$). Two tension rods prevent rotation of the cover. This results in a shear deformation of the sample of flowable solid. The force required ($F_1$ and $F_2$) is measured. The flowability ff$_c$ of the flowable solid is determined from the ratio of consolidation stress $\sigma_1$ to yield strength $\sigma_c$.

Table 6 shows the measurement results.

The greater the flowability ff$_c$, the better the flow of the flowable solid. The following ranges of different flowability are defined (D. Schulze, Pulver and Schüttgüter [Powders and flowable solids], Springer, 2006, chapter 3.1.4, p. 42):

ff$_c$ smaller than or equal to 1, non-flowing, hardens
ff$_c$ greater than 1 and less than or equal to 2, very cohesive (to non-flowing)
ff$_c$ greater than 2 and less than or equal to 4, cohesive
ff$_c$ greater than 4 and less than or equal to 10, slightly flowing
ff$_c$ greater than 10, free-flowing.

TABLE 6

Powder-flowability ff$_c$ as in example 4 of the surface-treated particles from example 3

| Particle | ff$_c$ |
|---|---|
| P1 | 1.9 |
| P2 | 1.8 |
| P3 | 1.8 |
| P4 | 1.3 |
| P5 | 1.9 |
| P6 | 1.7 |
| P7 | 1.2 |
| P8 | 1.1 |
| P9 | 1.3 |

TABLE 6-continued

Powder-flowability ff$_c$ as in example 4 of the
surface-treated particles from example 3

| Particle | ff$_c$ |
|---|---|
| P10 | 1.8 |
| P11 | 1.7 |
| P12A | 1.9 |
| P12B | 1.7 |
| P12C | 2.2 |
| P13 | 1.7 |
| P14 | 1.6 |
| P15 | 1.8 |
| P16 | 1.5 |
| P17 | 2.3 |
| P18 | 1.4 |
| P19 | 1.9 |
| P20 | 1.3 |
| P21 | 1.4 |
| P22 | 1.7 |
| P23 | 1.3 |
| P24 | 1.5 |
| P25A | 1.0 |
| P25B | 1.4 |
| P26 | 1.3 |
| P27 | 1.4 |
| P28 | 2.0 |
| P29 | 1.8 |
| P30 | 1.6 |
| P31 | 1.5 |

The powder-flowability of the particles not of the invention is less than or equal to 1.5.

Example 5

Compositions

Z1: Masterbatches

The compositions with thermoplastics are also termed masterbatches. These masterbatches can be produced as specified below.

A dryblend was first produced from the surface-treated particles to be studied and polyethylene as example of a thermoplastic (LDPE: Lupolen Purell 1800 SP 15) in a concentration of 50% by weight, by weighing both components into a plastics bottle and then mixing for 15 min on a roller jar rolling mill. The resultant dryblend was then charged to the Brabender feed unit, and introduced by way of a conveying screw to the Leistritz DS ZSE 18HP twin-screw extruder for processing. The processing to give the masterbatch used a rotation rate of 150 revolutions per minute (rpm) and a temperature setting of 150° C. in all zones. The polymer strand was pelletized. This specification was used to produce the compositions Z1-P1 to Z1-P27.

Z2: White Paste

White pastes were produced as example of compositions with plasticizers.

90 g of dioctyl phthalate (DOP) were weighed into a 250 ml dissolver vessel. 167 g of the surface-treated particles were incorporated in portions within 3 min, with gentle stirring by a 3 cm dissolver disk (about 5 m/sec). The rotation rate of the dissolver was increased to 12 500 rpm, and the mixture was dispersed for five min.

This specification was used to produce the compositions Z2-P1 to Z2-P27.

Z3: Thermoset Compositions a: Concentrate paste: A dissolver was used to predisperse the pigments in the carrier resin (an unsaturated polyester resin; SMC). The concentration of the pigments in the paste was 70% by weight. Fine dispersion was achieved by way of a bead mill (1 h batchwise, 2 mm glass beads). The viscosity of the paste was about 0.6 Pa*s.

The compositions Z3a-P27 and Z3a-P12A were produced.

b: Semifinished products: The formulation constituents corresponding to table 7 were mixed by using a dissolver. The paste viscosity was in the range from 3 to 20 Pa*s.

TABLE 7

Compositions of the pastes for the production of semifinished products; the values stated are the parts by weight, the sum of which was more than 100; Z3b-P27 is not of the invention

| Component | Function | Z3b-P27 | Z3D-P12 |
|---|---|---|---|
| Palapreg P17-02 | Polyester resin | 70.0 | 70.0 |
| Palapreg H814-01 | Polyester resin | 30.0 | 30.0 |
| TEGOMER DA626 | Dispersing additive | 1.5 | 1.5 |
| TEGOMER M-Si2650 | Process additive | 2.0 | 2.0 |
| Trigonox C | Initiator | 1.5 | 1.5 |
| Millicarb OG | Calcium carbonate | 170.0 | 170.0 |
| Coathylene HA 1681 | Release agent | 5.0 | 5.0 |
| P12A | Particle | 0 | 8.5 |
| P27 | Particle | 8.5 | 0 |

The semifinished products were produced by processing these resin systems together with 25% of glass fibers (Vetrotex P204 2400 tex) to give prepregs.

Processing parameters for press: temperature=150 to 155° C., pressure=about 80 bar (1000 kN), time=150 to 180 sec, closure velocity=8 mm/s.

Example 6

Dispersibility Testing of Surface-treated Particles

E2: Pressure Filter Test on Masterbatches

The pressure filter value was determined by using the Brabender Plasti-Corder Lab-Station single-screw extruder (screw diameter/screw length: 30 mm/25D). A screen pack from GKD with a PZ-Microdur 14 (filter fineness 14 μm) and a supporting fabric with 315 μm mesh width was used. The extruder was heated to a temperature of 200° C. The temperature of the filter equipment was set to 230° C. After thorough flushing of the extruder with LDPE, the filter holder with the screen pack was incorporated. After charging of the masterbatch pellets to be tested and discharge of the pigmented material at the bypass, the melt stream was passed through the screen pack, and computer-assisted capture of measured data was begun. The measured data were recorded until a maximal pressure of 150 bar was reached, or else if the pressure rise was small until a duration of 60 minutes was registered. Throughput was 40 g/min.

Table 8 shows the measurement results.

The measure of dispersion quality is the pressure filter value (PFV), calculated from the following formula:

$$PFV = \frac{(p_{max} - p_0) \times F \times 100}{(t \times K \times G)} \; [bar \times cm^2/g]$$

$p_{max}$: final pressure [bar]
$p_0$: initial pressure [bar]
F: filter area=6.16 cm$^2$
t: measured time [min]
K: pigment concentration [% by weight], based on entire composition
g throughput [g/min]

TABLE 8

Pressure filter values as in example 6 (E2)
for compositions from example 5 (Z1)

| Compositions | Pressure filter value [bar * cm²/g] |
|---|---|
| Z1-P1 | 0.39 |
| Z1-P2 | 0.48 |
| Z1-P3 | 0.93 |
| Z1-P4 | 1.65 |
| Z1-P5 | 0.41 |
| Z1-P6 | 0.88 |
| Z1-P7 | 2.49 |
| Z1-P8 | 3.90 |
| Z1-P9 | 2.77 |
| Z1-P10 | 0.33 |
| Z1-P11 | 0.40 |
| Z1-P12A | 0.20 |
| Z1-P12B | 0.67 |
| Z1-P12C | 0.13 |
| Z1-P13 | 0.89 |
| Z1-P14 | 0.44 |
| Z1-P15 | 0.38 |
| Z1-P16 | 0.63 |
| Z1-P17 | 0.82 |
| Z1-P18 | 1.65 |
| Z1-P19 | 0.65 |
| Z1-P20 | 1.79 |
| Z1-P21 | 4.23 |
| Z1-P22 | 0.38 |
| Z1-P23 | 1.10 |
| Z1-P24 | 5.33 |
| Z1-P25A | 6.55 |
| Z1-P25B | 3.70 |
| Z1-P26 | 2.38 |
| Z1-P27 | 1.06 |
| Z1-P28 | 0.45 |
| Z1-P29 | 0.87 |
| Z1-P30 | 1.79 |
| Z1-P31 | 1.91 |

The lower the pressure filter value, the better the dispersion of the pigment in the polymer. Pressure filter values ≥1 bar*cm²/g indicate lack of dispersibility.

E3: Testing of Masterbatches in Flat Polymer Films:

The masterbatches from example 5 (Z1) were extruded by the following process to give films. For this, the masterbatches were diluted with LDPE pellets (Purell PE 3020H) to a concentration of 10% by weight of pigment. To this end, masterbatch and polymer pellets were charged to a plastics bottle and shaken by hand for half a minute. The sample was then extruded in the Brabender Plasti-Corder Lab-Station (screw diameter/screw length: 30 mm/25D) at 15 rpm at a temperature of 190° C. A film of width about 8 cm was discharged by way of a slot die. The film was drawn off by way of a conveyer belt, cooled, and wound to give a roll.

5 pieces of length about 50 cm from the film were subjected to assessment. The assessment was made in transmitted light in respect of the number of undispersed agglomerates at two different magnifications (0 times: no magnification; 30 times: magnification by a factor of 30). The size of the specks of undispersed material, consisting of incompletely dispersed agglomerates, had no effect on the grade allocated here.

The results were allocated grades within a five-level system, where grade 1 indicates no specks of undispersed material, grade 2 indicates a few specks of undispersed material (there being test areas with from 1 to 2 specks of undispersed material but also test areas with no specks of undispersed material), grade 3 indicates a moderate number of specks of undispersed material (all of the test areas having specks of undispersed material, on average less than 5 per test area), grade 4 indicates a large number of specks of undispersed material (all test areas having from 5 to 10 specks of undispersed material), and grade 5 indicating a very large number of specks of undispersed material (all test areas on average having at least 10 specks of undispersed material).

The values in table 9 are obtained as grade from the evaluation of 5 test areas.

At grade 3 and above, the masterbatches are unsuitable for the productin of films. Initial assessment was carried out here without magnification.

TABLE 9

Allocation of grades to the test areas from example 6
(E3) on the basis of compositions from example 5 (Z1)

| Compositions | Without magnification | With magnification by a factor of 30 |
|---|---|---|
| Z1-P1 | 1.5 | 2.5 |
| Z1-P2 | 1.5 | 2.5 |
| Z1-P3 | 2 | 3 |
| Z1-P4 | 1.5 | 2.5 |
| Z1-P5 | 1.5 | 2.5 |
| Z1-P6 | 1.5 | 2.5 |
| Z1-P7 | 2.5 | 3 |
| Z1-P8 | 1.5 | 2.5 |
| Z1-P9 | 2.5 | 3.5 |
| Z1-P10 | 2.5 | 4 |
| Z1-P11 | 2.5 | 3.5 |
| Z1-P12A | 2 | 3 |
| Z1-P12B | 2.5 | 3 |
| Z1-P12C | 1.5 | 2 |
| Z1-P13 | 1 | 2.5 |
| Z1-P14 | 1.5 | 2.5 |
| Z1-P15 | 1 | 1 |
| Z1-P16 | 1 | 1 |
| Z1-P17 | 1.5 | 1.5 |
| Z1-P18 | 2 | 2 |
| Z1-P19 | 1.5 | 2 |
| Z1-P20 | 2 | 2.5 |
| Z1-P21 | 3.5 | 4 |
| Z1-P22 | 1.5 | 1.5 |
| Z1-P23 | 2.5 | 3 |
| Z1-P24 | 3.5 | 4 |
| Z1-P25A | 4 | 4 |
| Z1-P25B | 2 | 2.5 |
| Z1-P26 | 1.5 | 2.5 |
| Z1-P27 | 2 | 2 |

E4: Testing in Plasticizers 3 g of the white pastes produced as in example 5 (Z2) were thoroughly mixed with a spatula in a plastics beaker with the same quantity of DOP. For fineness determination, the diluted paste was drawn on a Hegman block (grindometer), first on the 0 to 100 μm Hegman block and then, in the case of appropriately fine samples, on the 0 to 25 μm Hegman block (Erichsen). The fineness values determined visually in μm were recorded and are shown in table 10.

Fineness greater than 20 μm indicates inadequate dispersion.

TABLE 10

Determination of fineness as in example 6
(E4) of compositions from example 5 (Z2)

| Compositions | Fineness [μm] |
|---|---|
| Z2-P1 | 15 |
| Z2-P2 | 13 |
| Z2-P3 | 50 |
| Z2-P4 | 30 |

TABLE 10-continued

Determination of fineness as in example 6
(E4) of compositions from example 5 (Z2)

| Compositions | Fineness [μm] |
|---|---|
| Z2-P5 | 20 |
| Z2-P6 | 15 |
| Z2-P7 | 22 |
| Z2-P8 | 24 |
| Z2-P9 | 65 |
| Z2-P10 | 12 |
| Z2-P11 | 18 |
| Z2-P12A | 17 |
| Z2-P12B | 19 |
| Z2-P12C | 16 |
| Z2-P13 | 19 |
| Z2-P14 | 15 |
| Z2-P15 | 16 |
| Z2-P16 | 17 |
| Z2-P17 | 19 |
| Z2-P18 | 22 |
| Z2-P19 | 8 |
| Z2-P20 | 26 |
| Z2-P21 | >100 |
| Z2-P22 | 9 |
| Z2-P23 | >100 |
| Z2-P24 | >100 |
| Z2-P25A | >100 |
| Z2-P25B | 50 |
| Z2-P26 | 22 |
| Z2-P27 | 35 |

Not measurable: >100

E5: Properties of the Semifinished Products from Example 5 (Z3b)

Test samples were sawn from the semifinished product. A template was used to saw a piece with the following dimensions from the middle of the prepreg, perpendicularly to the direction of travel of the prepreg: 27 cm×38 cm. The thickness of the sheet was 4 mm.

For the subsequent mechanical tests, strips of width 10 cm were cut from the test samples, transversely with respect to the direction of travel of the prepreg. For the impact resistance test, test samples of length 80 mm were sawn from the material. The length of the test samples for the tensile tests was 170 mm. All of the test samples were rinsed with mains water, dried with a cloth, and stored for at least 24 h in a cabinet under controlled conditions of temperature and humidity.

Tensile strength was tested with a tensile tester from Frank/Zwick (23° C., 50% rel. humidity). The machine parameters were: initial load=20 N, velocity up to initial load=1 mm/min, test velocity=5 mm/min, clamping length=120 mm, and measurement length of incremental pick-up=80 mm.

Impact Resistance (Charpy):

The tests were carried out in accordance with ISO 179 with a 5 J pendulum.

TABLE 11

Results of the mechanical tests as in example 6 (E5)
on the semifinished products from example 5 (Z3b)

| | Tensile strength [MPa] | Impact resistance [kJ/m²] |
|---|---|---|
| Z3b-P27 | 63.1 | 47.9 |
| Z3b-P12A | 71.6 | 59.3 |

TABLE 11-continued

Results of the mechanical tests as in example 6 (E5)
on the semifinished products from example 5 (Z3b)

| | Tensile strength [MPa] | Impact resistance [kJ/m²] |
|---|---|---|
| Z3b-P28 | 71.4 | 60.1 |
| Z3b-P29 | 72.6 | 58.9 |

The marked increase in tensile strength (at least 11%) and in impact resistance (at least 18%) when the particles of the invention are used can be seen when comparison is made with the example not of the invention.

What is claimed is:

1. A surface-treated particle obtained by a process for treating a surface of a primary particle, comprising contacting the primary particle with at least one compound of formula (I)

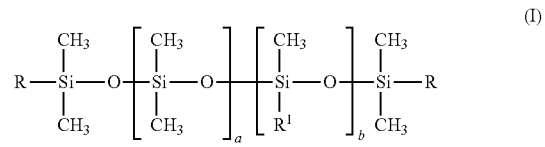

wherein

R identically or differently is $R^1$, methyl, or hydroxyl, $R^1$ identically or differently is a polyether moiety of formula (III)

$$-Z-(O-C_mH_{2m-(n-1)})_o-[O-(AO)_r-R_3]_n \qquad (III),$$

wherein

Z is a branched alkylene moiety or an unbranched alkylene moiety having from 2 to 4 carbon atoms, m is from 2 to 4, n is from 1 to 3, o is 0 or 1, AO identically or differently is an oxyalkylene moiety comprising an oxyethylene moiety, an oxypropylene moiety, and/or an oxybutylene moiety, $R^3$ identically or differently is hydrogen or an alkyl moiety having from 1 to 4 carbon atoms, with the proviso that in $R^1$ a total number of carbon atoms and oxygen atoms is at least 70, with the proviso that r has a value that, taken together with m and n, provides said group $R^1$ with a total number of carbon atoms and oxygens atoms of at least 70, a is from 20 to 200, b is from 1 to 50, with the proviso that if none of moieties R is $R^1$, b is at least 3, wherein 0.01 to 2% by weight of the compound of the formula (I) is contacted with the primary particle, based on a mass of the primary particle to be treated, and wherein the surface-treated particle is a $TiO_2$ particle, a $BaSO_4$ particle, a ZnS particle, and/or a lithopone particle.

2. The particle as claimed in claim 1, wherein $R^1$ identically or differently is $-(CH_2)_p-O-EO_x-PO_y-BO_z-R^3$, with the proviso that in $R^1$ the total number of carbon atoms and oxygen atoms is at least 70, EO is oxyethylene, PO is oxypropylene, BO is oxybutylene, x is from 0 to 20,
y is from 5 to 100,
z is from 0 to 20, and
p is from 2 to 4.

3. The particle as claimed in claim 1, wherein a numeric ratio of a to b is from 8:1 to 18:1.

4. The particle as claimed in claim 2, wherein x is between 0.05 and 1.2 times a sum of y and z.

5. The particle as claimed in claim 2, wherein
R is methyl,
a is from 80 to 95,
b is from 5 to 8,
$R^3$ is hydrogen,
x is from 3 to 5,
y is from 10 to 25, and
z is 0.

6. The particle as claimed in claim 1, which is a surface-treated $TiO_2$ particle.

7. The particle as claimed in claim 1, which has a dust value of at most 80 mg per 100 g of surface-treated particles.

8. A process for treating a surface of a primary particle, comprising:
contacting the primary particle with at least one compound of formula (I)

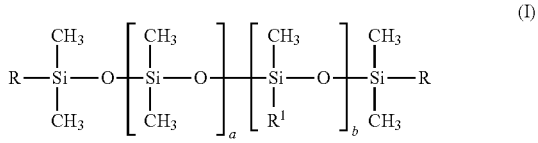
(I)

wherein
R identically or differently is $R^1$, methyl, or hydroxyl,
$R^1$ identically or differently is a polyether moiety of formula (III)

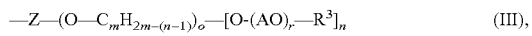
—Z—(O—$C_mH_{2m-(n-1)}$)$_o$—[O-(AO)$_r$—$R^3$]$_n$  (III), wherein
Z is a branched alkylene moiety or an unbranched alkylene moiety having from 2 to 4 carbon atoms,
m is from 2 to 4,
n is from 1 to 3,
o is 0 or 1,
AO identically or differently is an oxyalkylene moiety comprising an oxyethylene moiety, an oxypropylene moiety, and/or an oxybutylene moiety,
$R^3$ identically or differently is hydrogen or an alkyl moiety having from 1 to 4 carbon atoms,
with the proviso that in $R^1$ a total number of carbon atoms and oxygen atoms is at least 70,
with the proviso that r has a value that, taken together with m and n, provides said group $R^1$ with a total number of carbon atoms and oxygens atoms of at least 70,
a is from 20 to 200,
b is from 1 to 50,
with the proviso that if none of moieties R is $R^1$, b is at least 3, wherein 0.01 to 2% by weight of the compound of the formula (I) is contacted with the primary particle, based on a mass of the primary particle to be treated, and
wherein the primary particle is a $TiO_2$ particle, a $BaSO_4$ particle, a ZnS particle, and/or a lithopone particle.

9. A process for producing a polymer composition, comprising mixing the particle of claim 1 with a polymer.

10. The process as claimed in claim 9, wherein the polymer composition is processed to give a plastic molding or a plastic film.

11. A composition, comprising:
a polymer which comprises a particle as claimed in claim 1.

12. The composition as claimed in claim 11, wherein the polymer is a thermoset or thermoplastic.

13. The composition as claimed in claim 11, which is a masterbatch, a plastic molding, or a plastic film.

14. The particle of claim 2, which is a surface-treated $TiO_2$ particle.

15. The particle of claim 1, wherein
Z is a branched alkylene moiety or an unbranched alkylene moiety comprising 3 carbon atoms,
m is 3,
n is 1 or 2,
o is 0,
a is from 30 to 170, and
b is from 2 to 30, and
wherein 0.05 to 1% by weight of the compound of the formula (I) is contacted with the primary particle, based on the mass of the primary particles to be treated.

16. The particle as claimed in claim 2, wherein
x is from 3 to 15,
y is from 8 to 50, and
p is 2 or 3.

17. The particle as claimed in claim 3, wherein the numeric ratio of a to b is from 9:1 to 15:1.

18. The particle as claimed in claim 4, wherein x is between 0.07 and 0.8 times the sum of y and z.

19. The particle as claimed in claim 7, which has a dust value in a range of 8 to 75 mg per 100 g of surface-treated particles.

20. The particle as claimed in claim 1, wherein Z is a branched alkylene moiety or an unbranched alkylene moiety comprising 3 carbon atoms,
m is 3
n is 1 or 2, and
o is 0.

21. The particle as claimed in claim 1, wherein
$R^1$ identically or differently is a polyether moiety of formula (III)

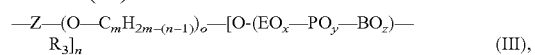
—Z—(O—$C_mH_{2m-(n-1)}$)$_o$—[O-(EO$_x$—PO$_y$—BO$_z$)—$R_3$]$_n$  (III), EO is oxyethylene,
PO is oxypropylene,
BO is oxybutylene,
x is from 0 to 20,
y is from 5 to 100, and
z is from 0 to 20.

* * * * *